US012515236B2

(12) United States Patent

Cox

(10) Patent No.: US 12,515,236 B2

(45) Date of Patent: Jan. 6, 2026

(54) GLUE GUN

(71) Applicant: TECHTRONIC CORDLESS GP, Anderson, SC (US)

(72) Inventor: Samuel Cox, Piedmont, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 279 days.

(21) Appl. No.: 18/054,821

(22) Filed: Nov. 11, 2022

(65) Prior Publication Data

US 2024/0157393 A1 May 16, 2024

(51) Int. Cl.

*B05C 17/005* (2006.01)

(52) U.S. Cl.

CPC ................................ *B05C 17/0053* (2013.01)

(58) Field of Classification Search

CPC .......................... B05C 17/0053; B05C 17/014

See application file for complete search history.

(56) References Cited

U.S. PATENT DOCUMENTS 2,995,159 A * 8/1961 Berggren ............ B05C 17/0053 D8/30
5,215,230 A * 6/1993 Lee ..................... B05C 17/0053 222/391
7,861,893 B2 1/2011 Voegele et al.
7,866,276 B2 1/2011 Mangelsen
8,430,270 B2 4/2013 Chen et al.
10,406,554 B2 9/2019 Seferi
2012/0211527 A1* 8/2012 Strobel-Schmidt .......................... B05C 17/0123 222/326
2017/0259295 A1* 9/2017 Seferi ............... B05C 17/00546

FOREIGN PATENT DOCUMENTS

CN 204276198 U 4/2015
CN 105598009 A 5/2016
CN 205914357 U 2/2017
CN 106694327 A 5/2017
CN 108906520 A 11/2018
CN 209791912 U 12/2019
CN 210546141 U 5/2020
CN 210753580 U 6/2020
CN 211275317 U 8/2020

(Continued)

OTHER PUBLICATIONS

Extended European Search Report for Application No. 23204376.0 dated Jun. 11, 2024 (10 pages).

*Primary Examiner* — Daniel Mcnally

(74) *Attorney, Agent, or Firm* — Michael Best & Friedrich LLP

(57) ABSTRACT

A glue gun including a housing, an actuator, a carrier, and a stroke adjustment mechanism. The housing extends along an axis and includes a first end and a second end opposite the first end. The first end includes an outlet configured to dispense glue from the housing. The actuator is coupled to the housing. The carrier is supported by the housing and is configured to support a glue stick. The carrier is coupled to the actuator and movable a distance along the axis in response to actuation of the actuator to guide the glue stick toward the first end. The stroke adjustment mechanism is coupled to the carrier to adjust the distance that the carrier is movable along the axis.

20 Claims, 13 Drawing Sheets

(56) References Cited

FOREIGN PATENT DOCUMENTS

| | | | |
|---|---|---|---|
| CN | 211937707 | U | 11/2020 |
| CN | 211937711 | U | 11/2020 |
| CN | 212652100 | U | 3/2021 |
| CN | 212664078 | U | 3/2021 |
| CN | 212820887 | U | 3/2021 |
| CN | 212856475 | U | 4/2021 |
| CN | 113145416 | A | 7/2021 |
| CN | 213914656 | U | 8/2021 |
| CN | 213943795 | U | 8/2021 |
| CN | 213996584 | U | 8/2021 |
| CN | 214262603 | U | 9/2021 |
| CN | 214554982 | U | 11/2021 |
| CN | 214718070 | U | 11/2021 |
| CN | 113731758 | A | 12/2021 |
| CN | 215197996 | U | 12/2021 |
| CN | 215507612 | U | 1/2022 |
| CN | 216025990 | U | 3/2022 |
| CN | 216323069 | U | 4/2022 |
| CN | 216368759 | U | 4/2022 |
| CN | 216396942 | U | 4/2022 |
| CN | 113798142 | B | 6/2022 |
| CN | 113102173 | B | 7/2022 |
| CN | 216965208 | U | 7/2022 |
| CN | 114932057 | A | 8/2022 |
| DE | 102016104981 | A1 | 9/2017 |
| IN | 110052372 | A | 7/2019 |

* cited by examiner

GLUE GUN

FIELD OF THE INVENTION

The disclosure relates to glue guns, and more specifically, hot glue guns.

BACKGROUND

Glue is typically utilized in applications for joining two or more objects or entities. The glue may be applied to said objects or entities through a plurality of means. In some instances, glue may be melted and applied to said objects or entities as hot glue. Hot glue provides an adhesive between the objects or entities that cools and hardens between the objects or entities to join the objects or entities.

SUMMARY

In one aspect, the disclosure provides a glue gun including a housing, an actuator, a carrier, and a stroke adjustment mechanism. The housing extends along an axis and includes a first end and a second end opposite the first end. The first end includes an outlet configured to dispense glue from the housing. The actuator is coupled to the housing. The carrier is supported by the housing and is configured to support a glue stick. The carrier is coupled to the actuator and movable a distance along the axis in response to actuation of the actuator to guide the glue stick toward the first end. The stroke adjustment mechanism is coupled to the carrier to adjust the distance that the carrier is movable along the axis.

In another aspect, the disclosure provides a glue gun including a housing, an actuator, a carrier, and a knob. The housing extends along an axis and includes a first end and a second end opposite the first end. The first end includes an outlet configured to dispense glue from the housing. The actuator is coupled to the housing. The carrier is supported by the housing and is configured to support a glue stick. The carrier is coupled to the actuator and movable a distance along the axis in response to actuation of the actuator to guide the glue stick toward the first end. The knob is positioned on or adjacent the second end and includes an aperture that is configured to receive and surround a glue stick after insertion of the glue stick into the housing.

In another aspect, the disclosure provides a glue gun including a housing, a trigger assembly, and a carrier. The housing extends along an axis and includes a first end and a second end opposite the first end. The first end includes an outlet configured to dispense glue from the housing. The trigger assembly includes a linkage mechanism and a trigger. The linkage mechanism has a first linkage coupled to the carrier and a second linkage. The trigger is operably coupled to the second linkage. The trigger is actuatable to translate the linkage mechanism and the carrier toward the first end of the housing. The carrier is supported by the housing and is configured to support a glue stick. The carrier is coupled to the actuator and movable a distance along the axis in response to actuation of the trigger to guide the glue stick toward the first end.

DETAILED DESCRIPTION

Figure 1:
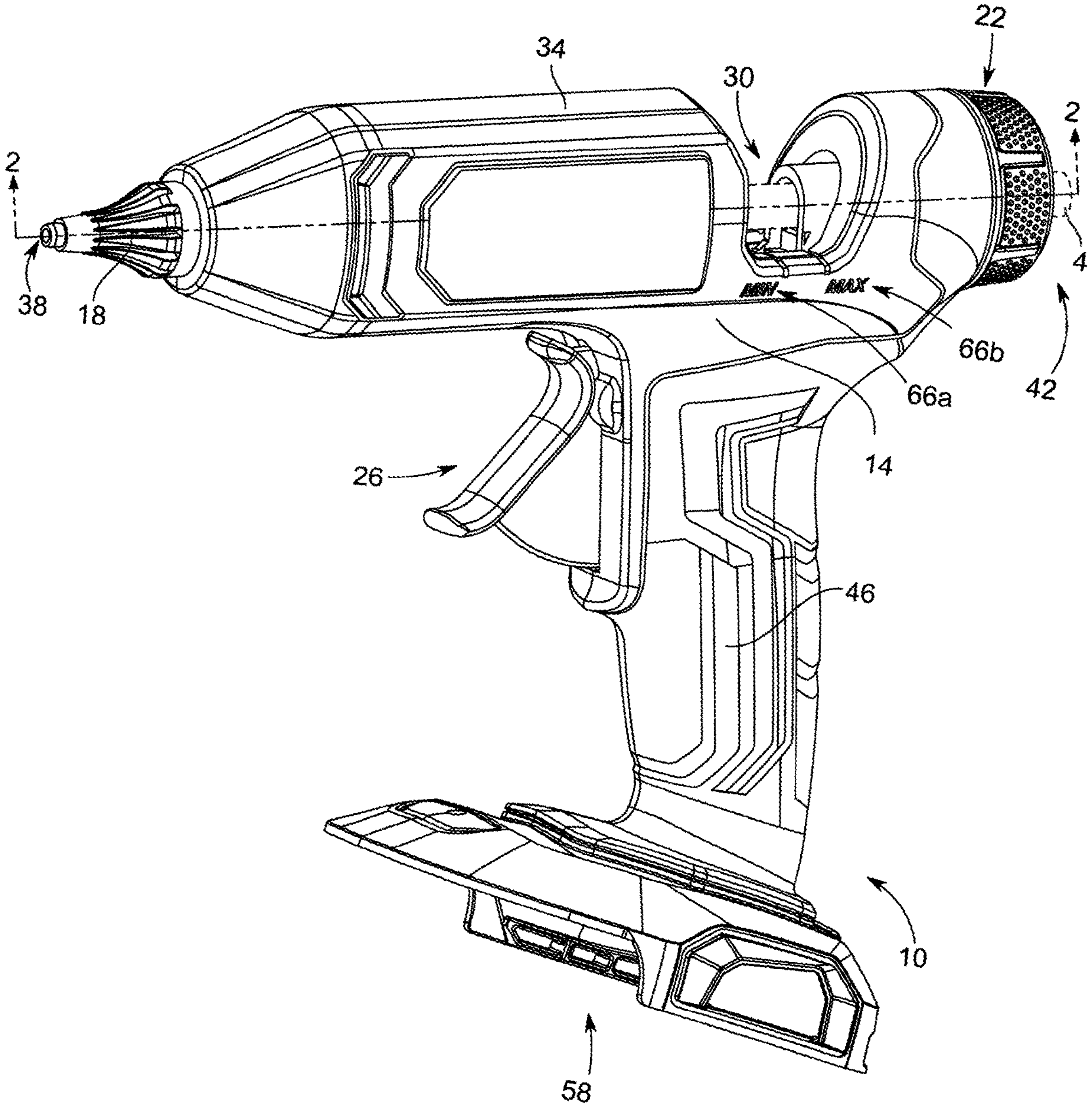
FIG. 1 is a perspective view of a glue gun including a housing, a stroke adjustment mechanism, a trigger assembly, and a carrier according to an embodiment of the disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The detailed description uses numerical and letter designations to refer to features in the drawings. Like or similar designations in the drawings and description have been used to refer to like or similar parts of the invention.

The singular forms “a,” “an,” and “the” include plural references unless the context clearly dictates otherwise. The terms “coupled,” “fixed,” and the like refer to both direct coupling or fixing, as well as indirect coupling or fixing through one or more intermediate components or features, unless otherwise specified herein. As used herein, the terms “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 2:
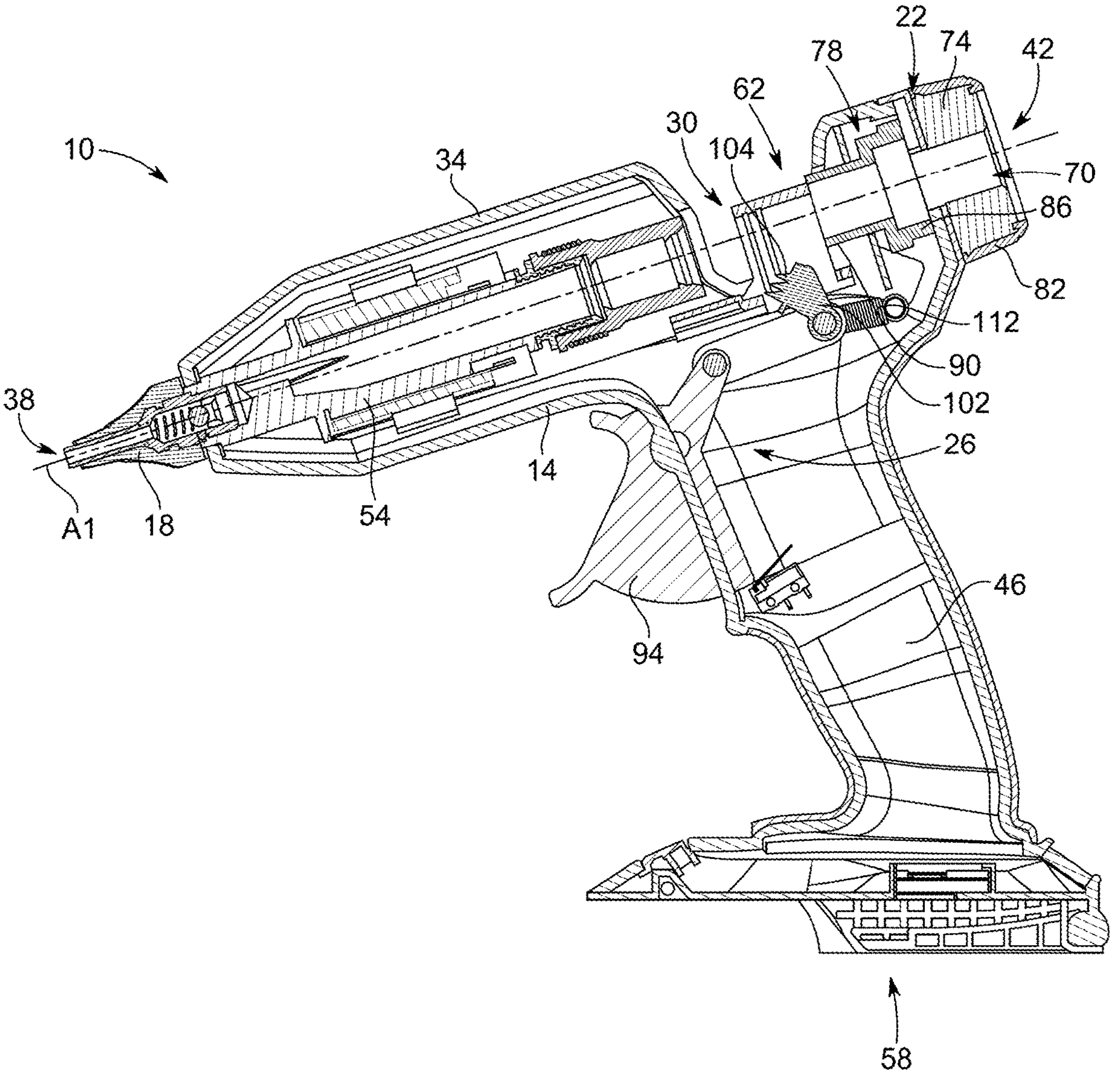
FIG. 2 is a section view of the glue gun of FIG. 1 taken along line 2-2 and illustrating the stroke adjustment mechanism, the trigger assembly, the carrier and a heating element.

FIG. 1 illustrates a glue gun 10 according to an embodiment of the disclosure. The glue gun 10 is configured to receive a glue stick 4 and to selectively melt the glue stick 4 for adhering a workpiece or workpieces. As illustrated in FIGS. 1 and 2, the glue gun 10 includes a housing 14, an output nozzle 18, a stroke adjustment mechanism 22, a trigger assembly 26, and a carrier 30. The housing 14 includes a first housing portion or main housing portion 34 that has a first end 38 and a second end 42 that is opposite the first end 38, and a second housing portion or handle housing portion 46 that extends from the main housing portion 34 at a location that is between the first end 38 and the second end 42. Each of the main housing portion 34 and the handle housing portion 46 may be formed of housing halves or in any other manner to form the shell of the glue gun 10. The handle housing portion 46 is configured to be grasped by a user for operation of the glue gun 10. The output nozzle 18 is positioned at the first end 38 of the main housing portion 34 and dispenses glue during operation of the glue gun 10.

With continued reference to FIGS. 1 and 2, the glue gun 10 includes a heating element 54 and a battery receptacle 58. The heating element 54 is disposed in the main housing portion 34 proximate the first end 38 (e.g., adjacent the output nozzle 18) to selectively heat and melt a front portion of the glue stick 4. The battery receptacle 58 is located at a distal end of the handle housing portion 46, and a battery pack may be attached to the battery receptacle 58 to provide power to the heating element 54.

Figure 3:
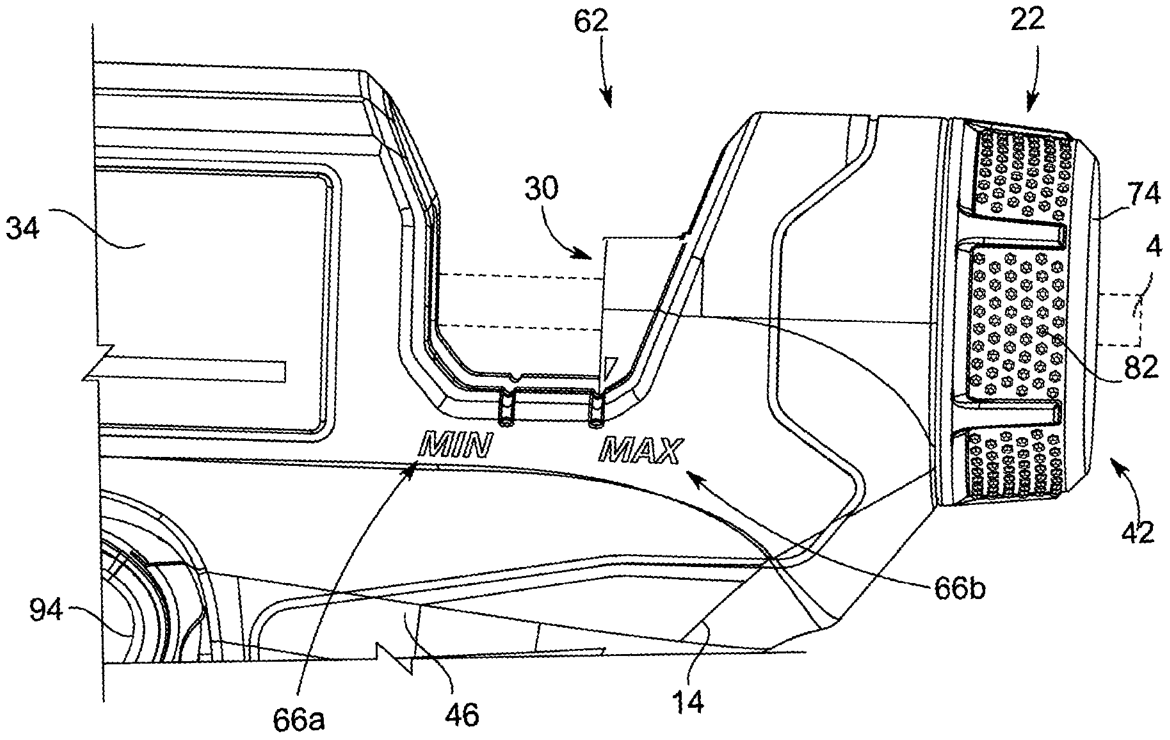
FIG. 3 is an enlarged side view of a rear portion of the glue gun of FIG. 1.

With reference to FIG. 3, the main housing portion 34 includes an opening or gap 62 adjacent the second end 42. The opening 62 is located closer to the second end 42 than the first end 38 and provides a visual of a rear end of the glue stick 4 and the position of the carrier 30 relative to a first (e.g., minimum) start position and a second (e.g., maximum) start position. With additional reference to FIG. 2, the first start position corresponds to a position in which the trigger assembly 26 is pulled the smallest amount or minimum distance and the carrier 30 is moved a minimum stroke length along the axis A1, which provides a minimum quantity of glue that may be dispensed from the glue gun 10. The second start position corresponds to a position in which the trigger assembly 26 can be pulled the largest amount or maximum distance and the carrier 30 is moved a maximum stroke length along the axis A1, which provides a maximum quantity of glue that may be dispensed from the glue gun 10. The main housing portion 34 includes a first indicia **66*a* to demarcate or indicate the first start position, and a second indicia 66*b* to demarcate or indicate the second start position. The illustrated indicia 66*a*, 66*b* are defined by notches or grooves in the main housing portion 34 adjacent the opening 62, although the indicia 66*a*, 66*b*** may take any form that is suitable to indicate the first start position and the second start position. In some embodiments, additional indicia may be provided to indicate start positions between the first start position and the second start position.

Figure 4:
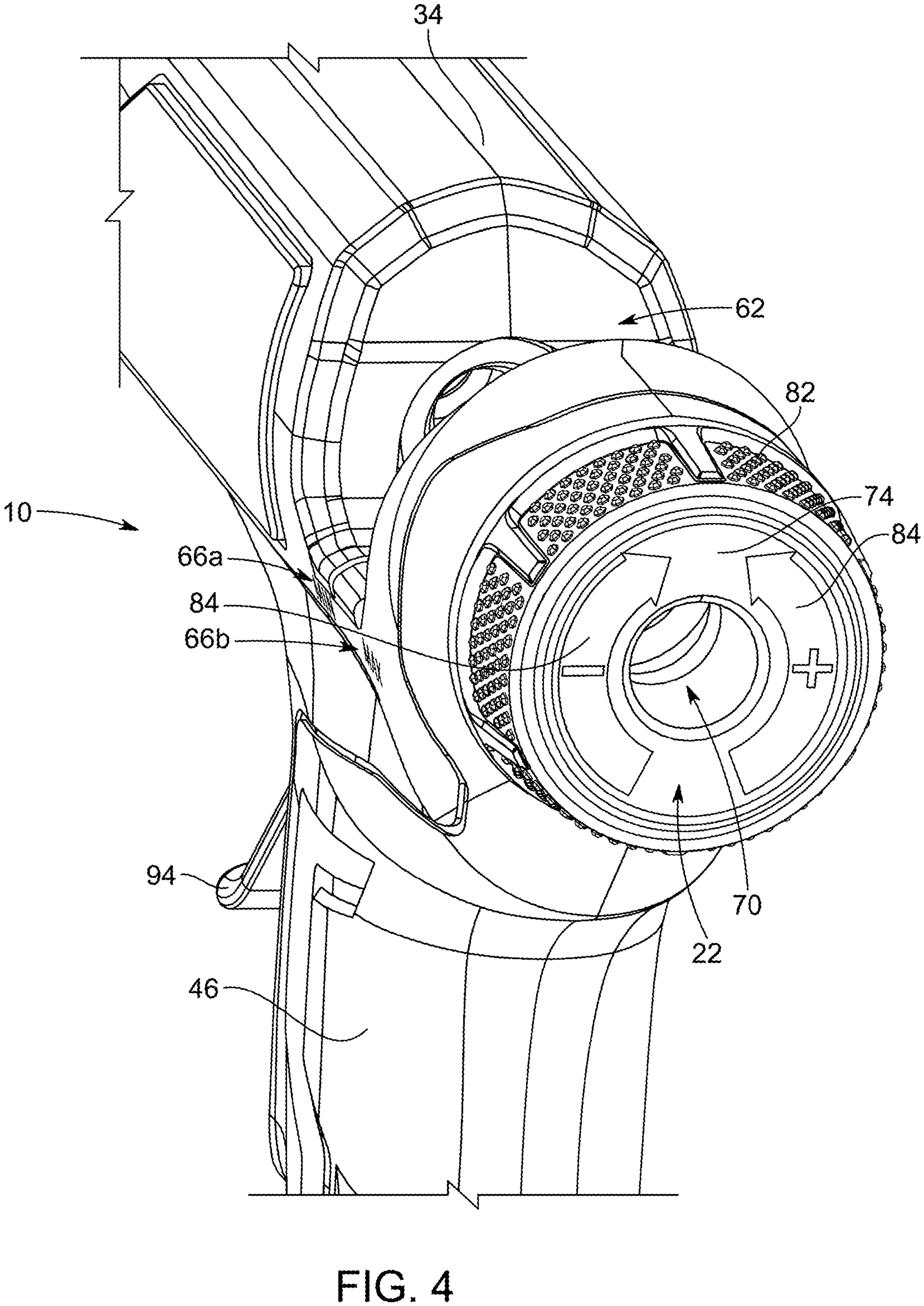
FIG. 4 is a rear perspective view of a portion of the glue gun.
Figure 5:
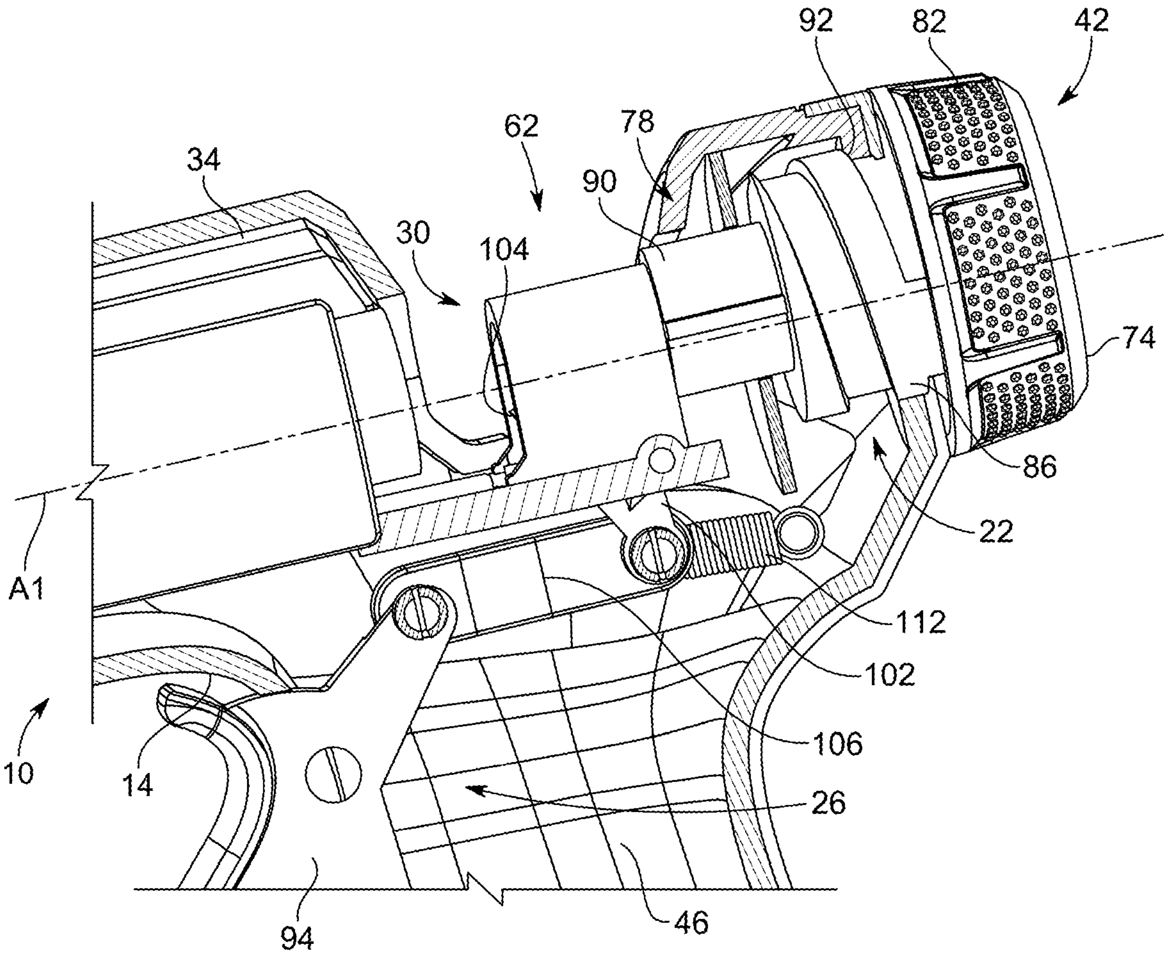
FIG. 5 is an enlarged side view of the glue gun with the stroke adjustment mechanism at a first position and with a portion of the housing removed.
Figure 6:
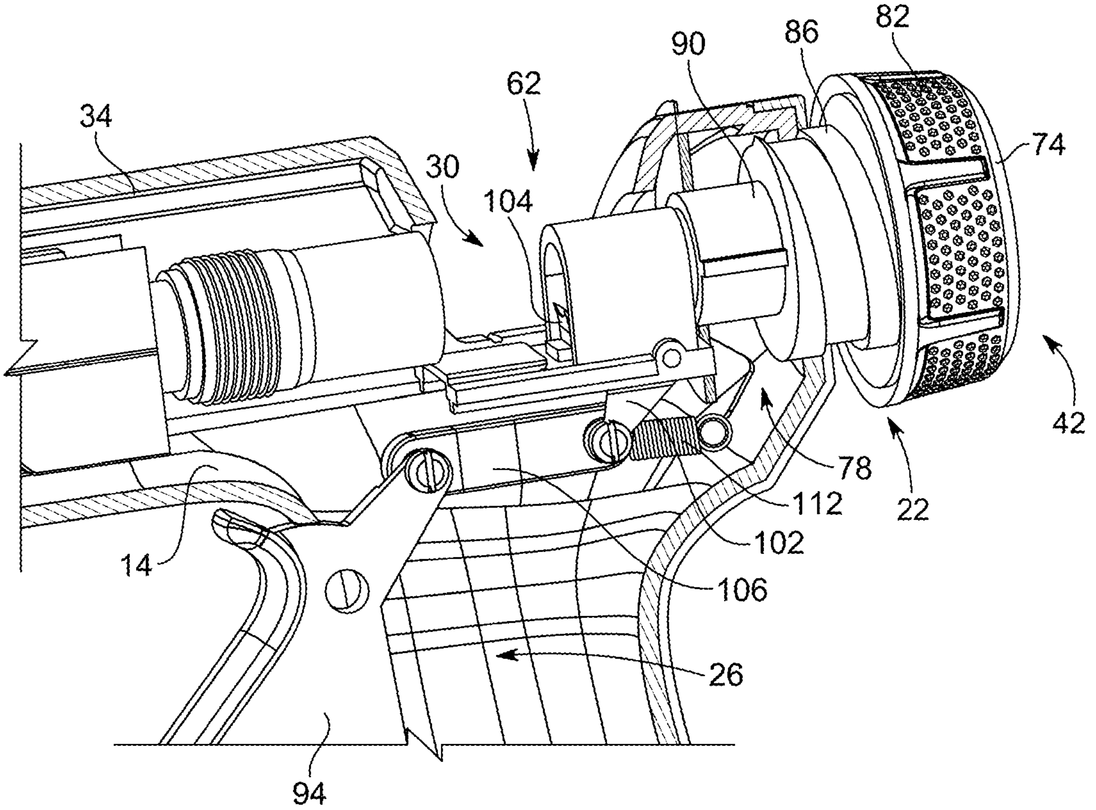
FIG. 6 is an enlarged side view of the glue gun with the stroke adjustment mechanism at a second position and with a portion of the housing removed.

As illustrated in FIGS. 4-6, the stroke adjustment mechanism 22 is positioned at or adjacent the second end 42 and is actuatable to adjust the amount of glue that may be dispensed from the output nozzle 18 (e.g., as illustrated in FIG. 1). With reference to FIG. 4, the stroke adjustment mechanism 22 has an aperture 70 that is centrally located and that facilitates insertion of a glue stick 4 into the glue gun 10. The glue stick 4 (FIG. 3) may protrude from the second end 42 depending on the length of the glue stick 4. Referring to FIGS. 4-6, the stroke adjustment mechanism 22 includes a knob 74 and a ram 78 that is coupled to or engaged with the knob 74 to facilitate movement of the ram 78 along the axis A1 relative to the housing 14 as the knob 74 is turned. More specifically, the knob 74 includes a grip 82 and is rotatable relative to the housing 14 to move the ram 78 along the axis A1 toward the first end 38 or the second end 42 based on the direction that the knob 74 is turned. In some embodiments, the knob 74 and the ram 78 may be formed monolithically (i.e. as one piece), or as separate pieces that are coupled together in some manner (detachable or fixed).

The knob 74 includes knob indicia 84 that are disposed on an end of the grip 82 to be visible to a user. As best shown in FIG. 4, the knob indicia 84 are located around the aperture 70 and provide respective indicators to a user regarding rotation of the knob 74 clockwise and counter-clockwise and the corresponding impact of the rotation on the stroke length of the carrier 30. As viewed from the rear of the glue gun 10 (e.g., as shown in FIG. 4), the knob indicia 84 are depicted as a counter-clockwise extending arrow and a clockwise extending arrow. The counter-clockwise extending arrow includes a plus symbol to indicate that counter-clockwise rotation of the knob 74 increases the stroke length for the carrier 30. That is, and with reference to FIG. 6, counter-clockwise rotation of the knob 74 moves the ram 78 away from the carrier 30 and increases the distance the carrier 30 can move. As such, counter-clockwise rotation of the knob 74 enables an increase in the amount of glue to be dispensed from the glue gun 10. The clockwise extending arrow includes a minus symbol to indicate that clockwise rotation of the knob 74 decreases the maximum stroke length for the carrier 30. That is, with reference to FIG. 5, clockwise rotation of the knob 74 moves the ram 78 toward the carrier 30 and decreases the distance the carrier 30 can move. As such, clockwise rotation of the knob 74 enables a decrease in the amount of glue to be dispensed from the glue gun 10. Other indicators may be disposed on or adjacent the knob 74 to indicate relative movement of the carrier 30 and impact of rotation on the amount of glue that may be dispensable from the glue gun 10.

With reference to FIGS. 2, 5, and 6, the ram 78 has a threaded body 86 and a projection 90 that extends forward from the threaded body 86 along the axis A1. As illustrated, the threaded body 86 and the projection 90 are formed monolithically (e.g., a single piece, co-molded, etc.), although they may be coupled together as separate pieces. As best shown in FIG. 5, the threaded body 86 is rotatably coupled to the main housing portion 34 such that threads on the threaded body 86 engages a wall 92 at the second end 42. The projection 90 extends toward and is engaged with a rear side of the carrier 30 and defines a stroke length of the carrier 30 at or between the minimum stroke length and the maximum stroke length (FIG. 3). That is, the projection 90 defines a rearward limit of the carrier 30 and, in the context of movement of the ram 78 along the axis A1, facilitates adjustment of the starting position of the carrier 30 before the trigger assembly 26 is actuated.

Figure 7:
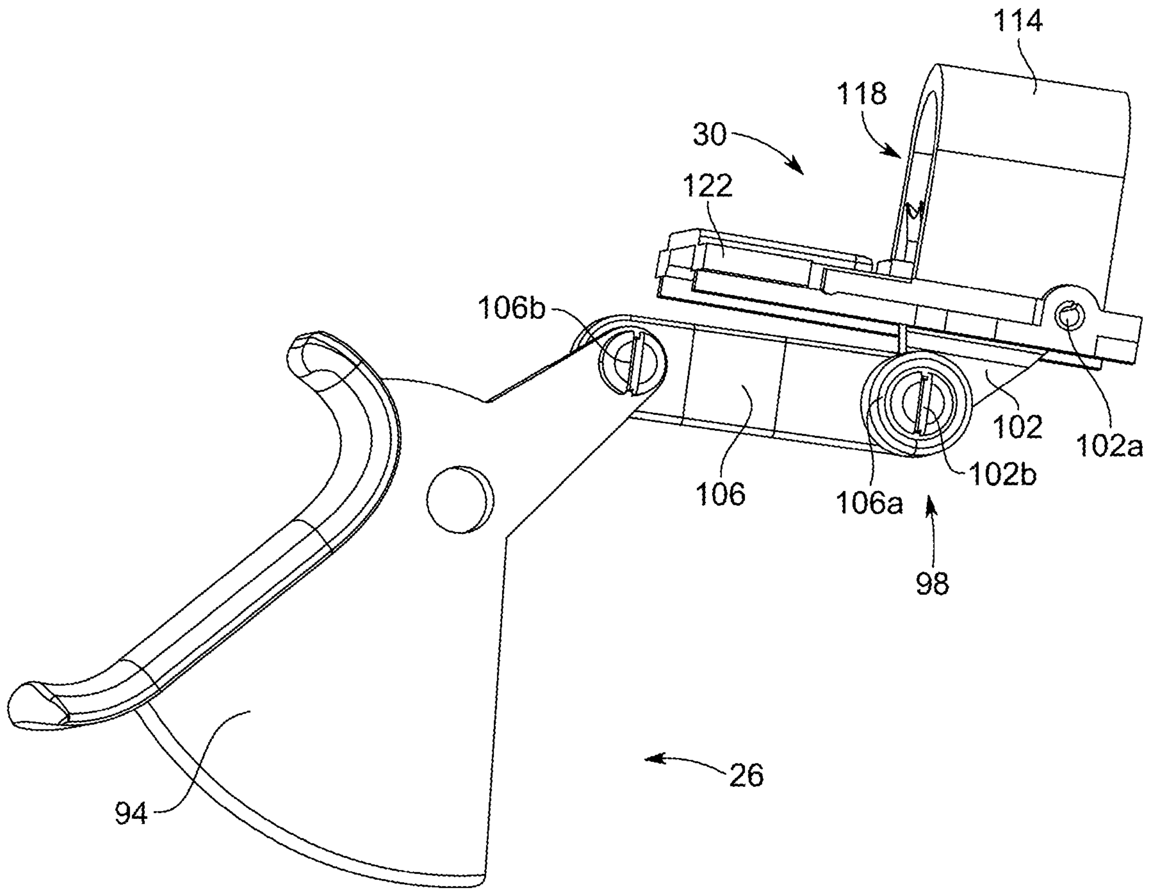
FIG. 7 is a perspective view of the trigger assembly and the carrier of the glue gun.
Figure 8:
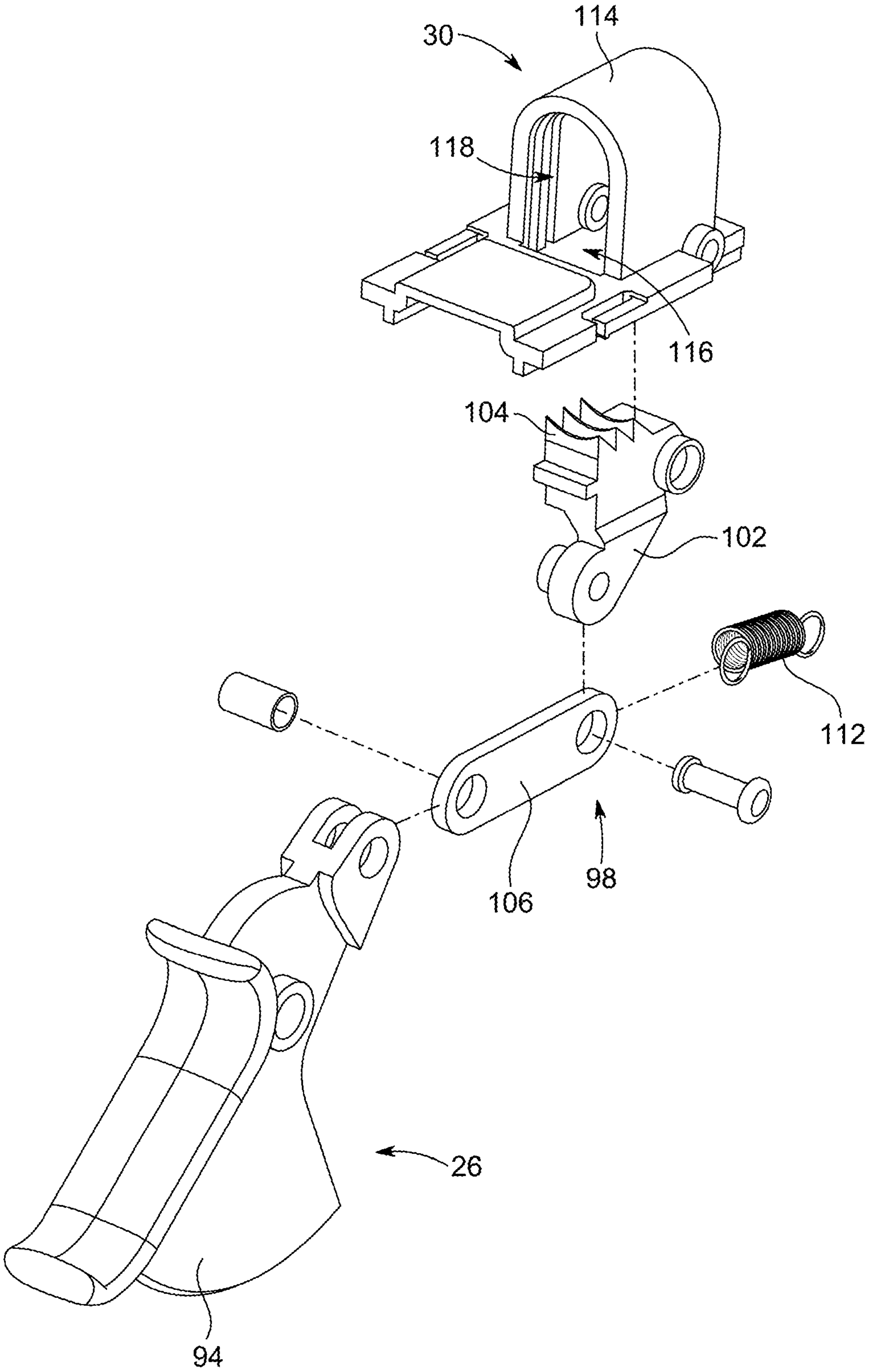
FIG. 8 is an exploded view of the trigger assembly and the carrier of the glue gun.

With reference to FIGS. 1, 7, and 8, the trigger assembly 26 includes a trigger 94 that at least partially protrudes from the handle housing portion 46 for selective actuation by a user. The trigger 94 is, for example, ergonomically shaped to receive the finger of a user, although it will be appreciated that other actuators may be provided to actuate the glue gun 10. The trigger assembly 26 also includes a linkage mechanism 98 that has a first linkage 102 with teeth 104 and a second linkage 106. The first linkage 102 is coupled to the carrier 30 at a first end 102*a* of the first linkage 102 and to the second linkage 106 at a second end 102*b*. The teeth 104 are formed at the first end 102*a* of the first linkage 102. The second linkage 106 is coupled to the first linkage 102 at a first end 106*a* of the second linkage 106 and to the trigger 94 at a second end 106*b* of the second linkage 106. The linkage mechanism 98 operably couples the trigger 94 to the carrier 30. As shown in FIGS. 5, 6, 8, 10 and 11, the trigger assembly 26 includes a spring 112 (e.g., a tension coil spring or other suitable elastic or bias member) that is coupled between the first end 106*a* of the second linkage 106 and the main housing portion 34 (e.g., at or adjacent the point of connection between the first linkage 102 and the second linkage 106). As explained in more detail below, the spring 112 biases the trigger 94 to an unactuated position or state (e.g., illustrated in FIG. 10) absent a force acting on the trigger 94. Other bias mechanisms may be included to place the trigger 94 to the unbiased position.

Figure 10:
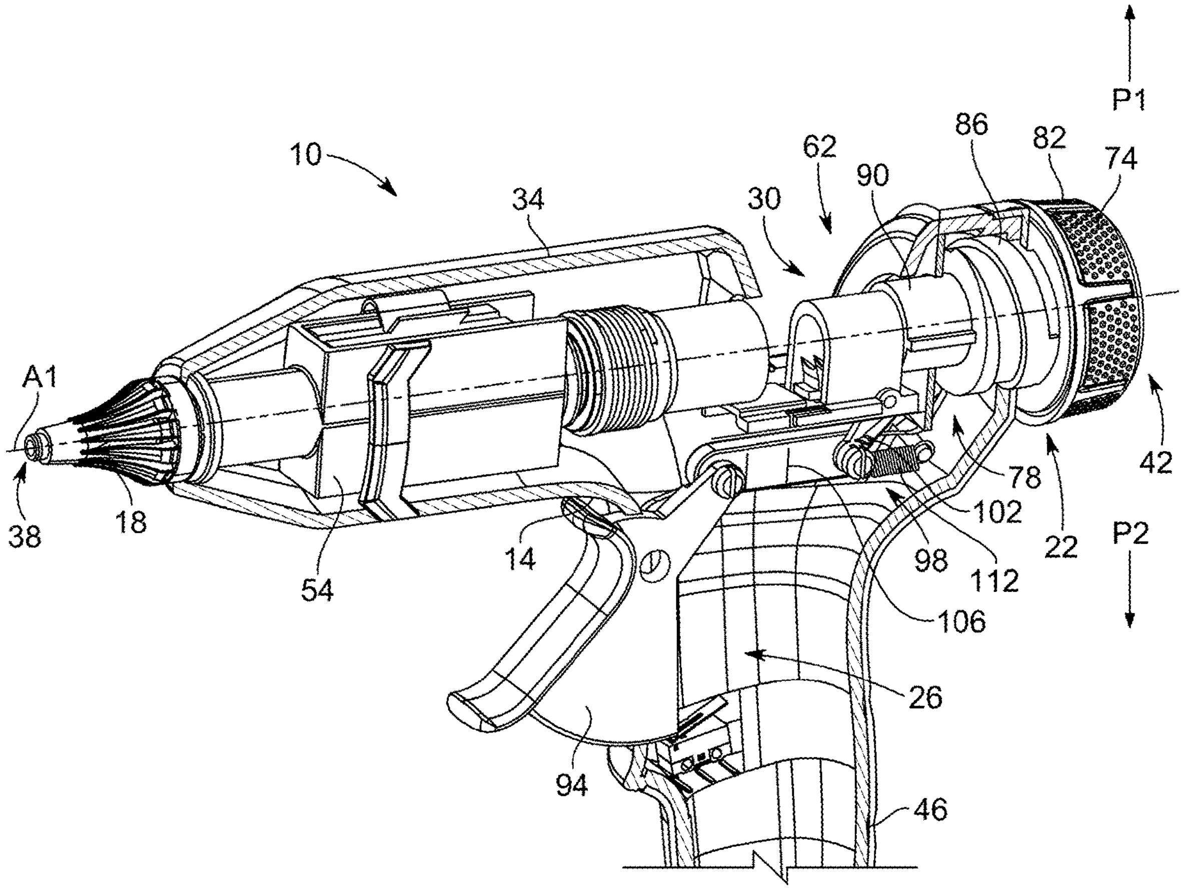
FIG. 10 is a side view of a portion of the glue gun illustrating the carrier in a selected position among a plurality of available positions and the trigger in a first or unactuated state.
Figure 11:
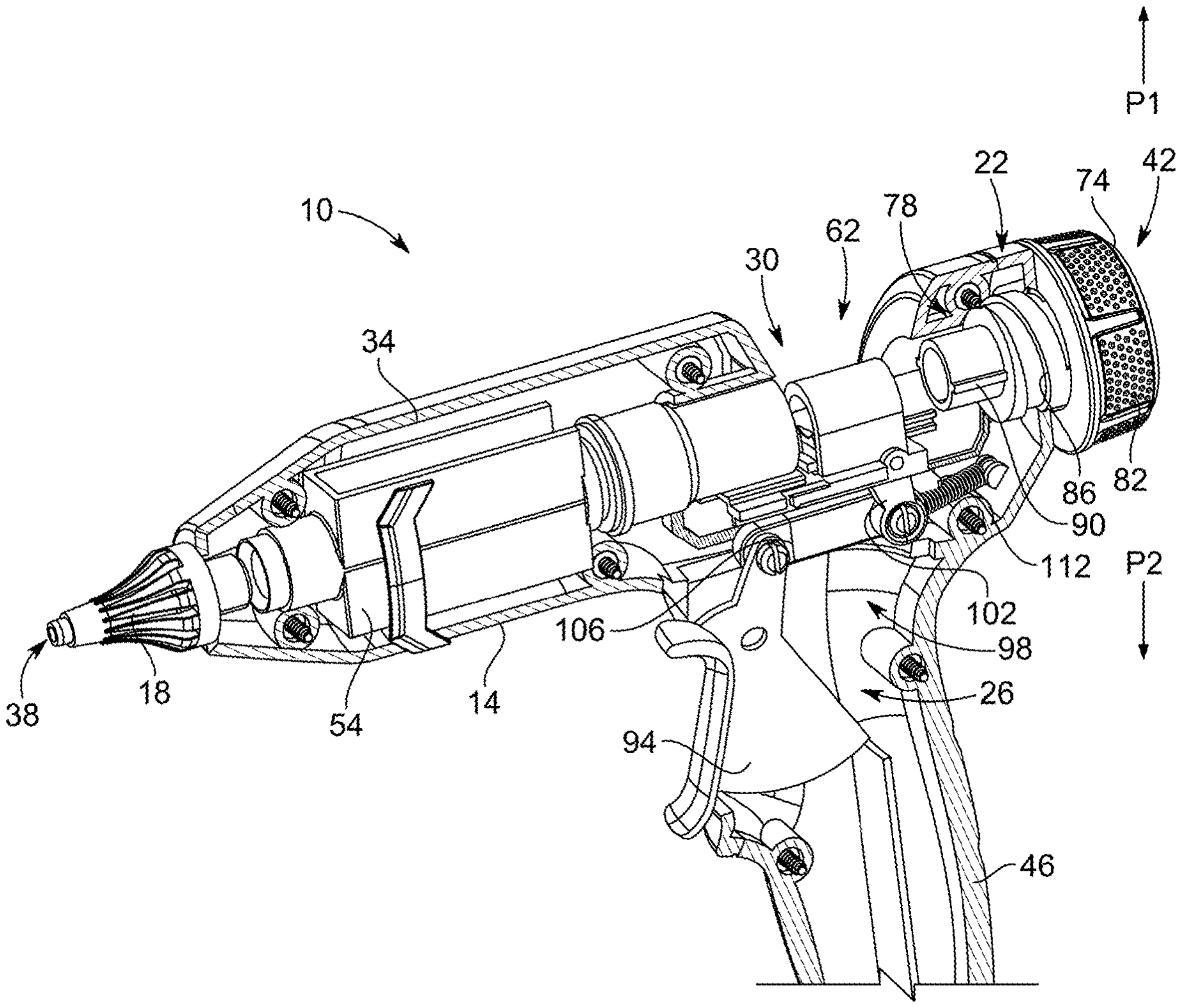
FIG. 11 is a side view of a portion of the glue gun illustrating the carrier pulled forward by movement of the trigger to a second or actuated state.

When the trigger 94 is actuated, and with reference to FIGS. 10 and 11, the trigger 94 rotates or pivots between the unactuated position and a full-actuated position or state (e.g., illustrated in FIG. 11). It will be appreciated that the trigger 94 may be moved from the unactuated position toward the full-actuated position without reaching the full-actuated position (e.g., by pulling the trigger 94 only a small amount). When the trigger 94 is actuated, the spring 112 extends from a static position and acts on the linkage mechanism 98 to return the trigger 94 to the unactuated position after pressure or force is removed from the trigger 94. Pivotal movement of the trigger 94 translates the second linkage 106 forward (toward the first end 38), which in turn moves the first linkage 102 forward. The first linkage 102 may move in a combination of translation along the axis A1 and rotation about the connection to the second linkage 105, which may move the teeth 104 to engage the glue stick 4 and hold the glue stick for translation along the axis A1. The glue stick 4 is carried forward by the carrier 30 due to the movement of the trigger 94 and the corresponding movement of the first and second linkages 102, 106. The amount of movement of the carrier 30 toward the first end 38 determines the quantity of glue that is dispensed. The pivotal or arcuate distance between the unactuated position and the full-actuated position for the trigger 94 changes when the position of the carrier 30 is adjusted due to rotation of the knob 74 and corresponding movement of the ram 78. For example, and with reference to FIG. 12, when the knob 74 is rotated such that the carrier 30 has been moved toward the first end 38 (relative to the starting position of the carrier 30 before rotation of the knob), the pivotal or arcuate distance of the trigger 94 between the unactuated position and the full-actuated position (illustrated as a first trigger actuation path P1) is relatively small and correlates to the stroke length of the carrier 30 (e.g., the minimum stroke length). With reference to FIG. 13, the knob 74 is rotated such that the carrier 30 has been moved toward the second end 42 (relative to the starting position of the carrier 30 before rotation of the knob 74), the pivotal or arcuate distance of the trigger 94 between the unactuated position and the full-actuated position (illustrated as a second trigger actuation path P2) is relatively large and correlates to the stroke length of the carrier 30 (e.g., the maximum stroke length). In the illustrated embodiment, the second trigger actuation path P2 is greater than the first trigger actuation path P1 of FIG. 12.

Figure 9:
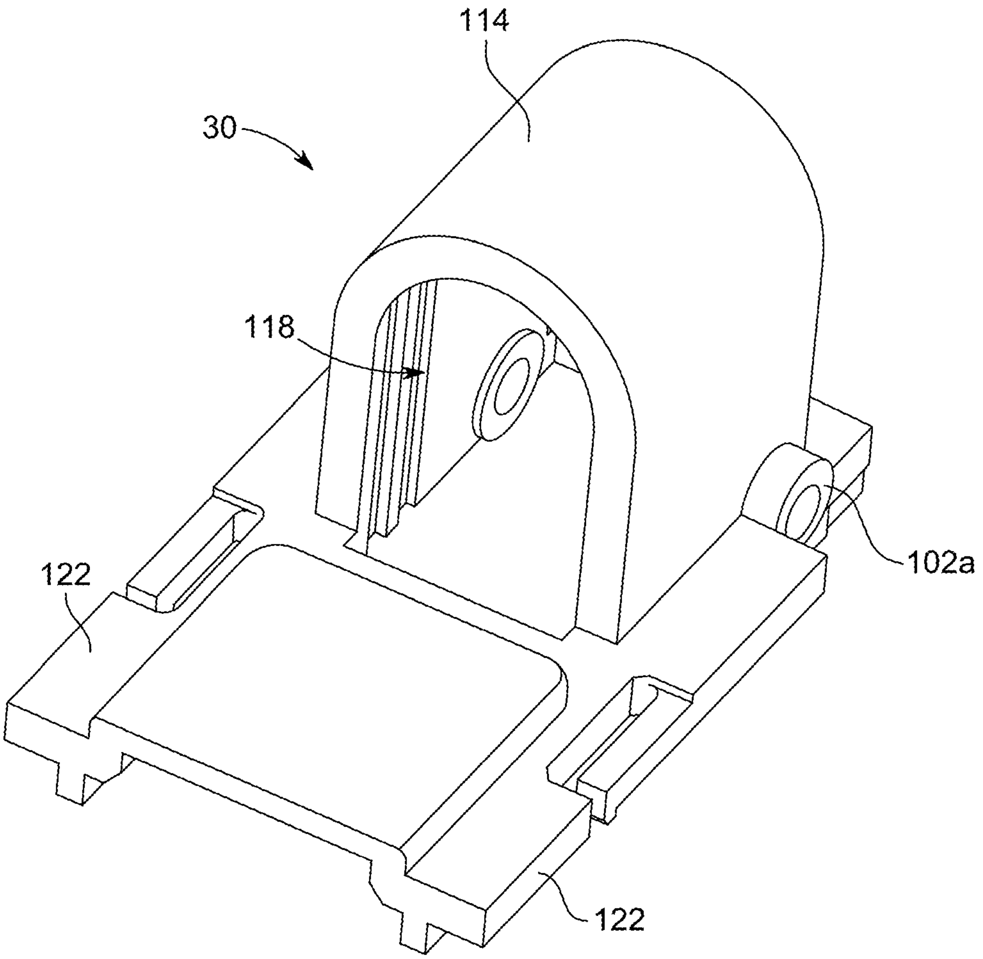
FIG. 9 is a perspective view of the carrier.

With reference to FIGS. 8-10, the carrier 30 is disposed in the main housing portion 34 between the first end 38 and the second end 42 and is operably coupled to the trigger assembly 26 such that the carrier 30 translates toward the first end 38 of the main housing portion 34 when the trigger 94 is actuated. The carrier 30 includes a carrier body 114, a cavity 118 defined in the carrier body 114, and carrier arms 122 that extend from the carrier body 114 toward the first end 38 of the main housing portion 34. The first linkage 102 is pinned to the carrier body 114 such that the teeth 104 extend into the cavity 118. The plurality of teeth 104 engage the glue stick 4 when the carrier 30 receives the glue stick 4. In some embodiments, actuation of the trigger 94 may press the teeth 104 into the glue stick 4 due to the connection of the trigger 94 to the linkage mechanism 98. The linkage mechanism 98 operably couples the carrier 30 to the trigger 94 such that when the trigger 94 is actuated, the carrier 30 translates toward the first end 38 of the main housing portion 34 to move the glue stick 4 forward. The teeth 104 engage the glue stick 4 to pull the glue stick 4 forward as the trigger 94 is actuated to move the carrier 30.

Figure 12:
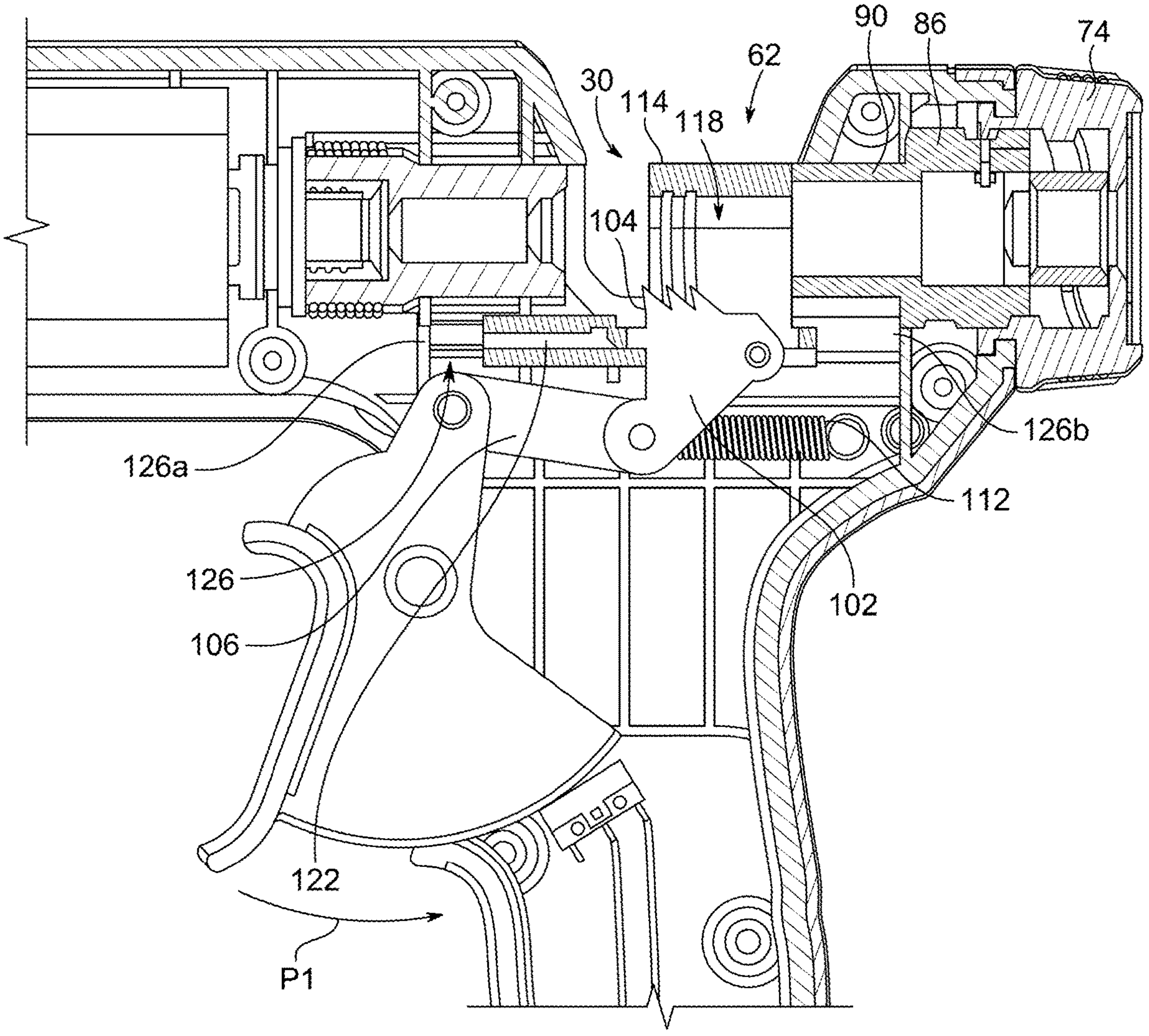
FIG. 12 is an enlarged section view of the glue gun with the stroke adjustment mechanism at the first position.
Figure 13:
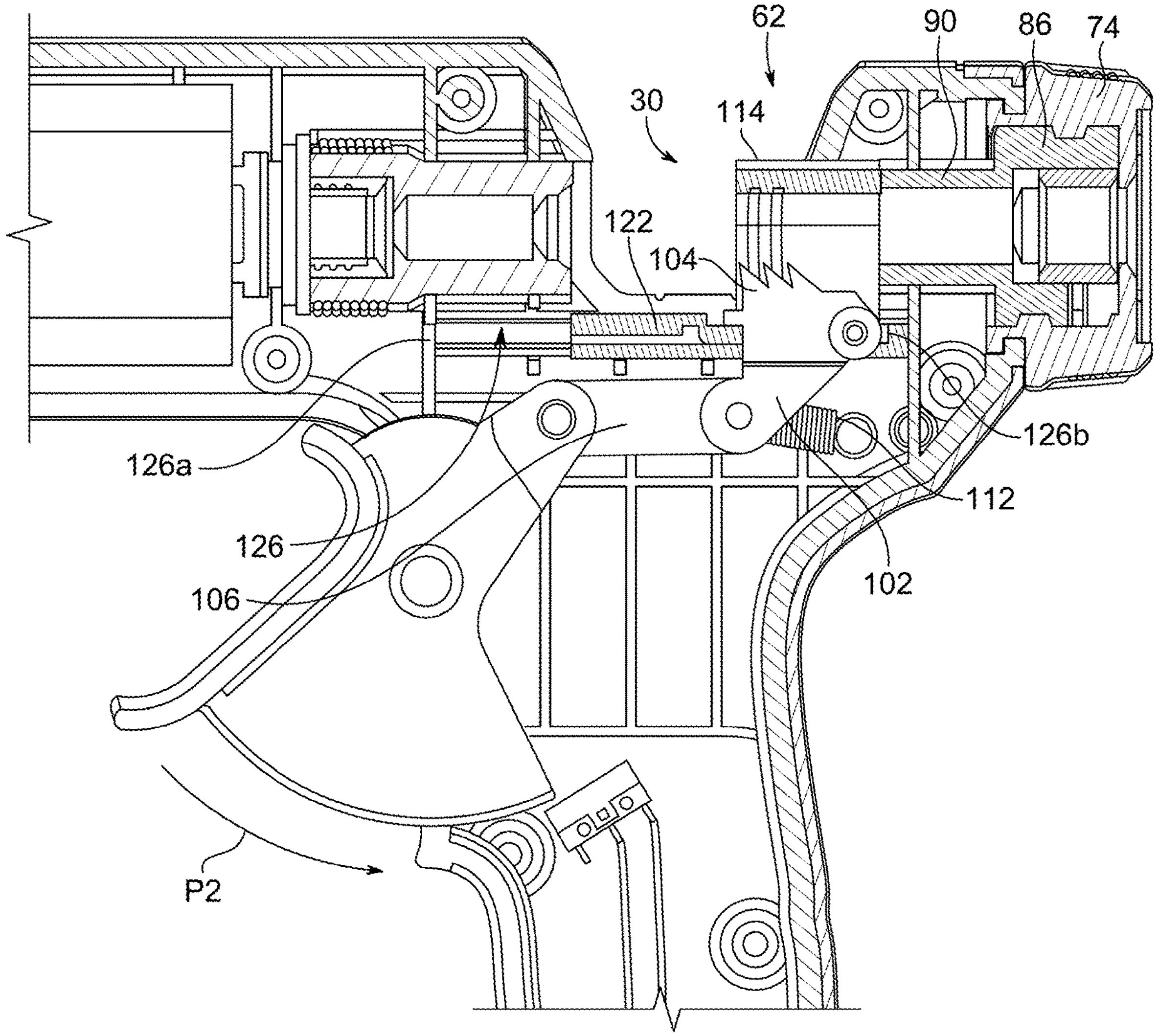
FIG. 13 is an enlarged section view of the glue gun with the stroke adjustment mechanism at the second position.

With reference to FIGS. 12 and 13, the carrier arms 122 may engage carrier slots 126 formed in the housing 14 to guide the carrier 30 in a translational manner and inhibit rotation of the carrier body 114. The carrier slots 126 include a front end 126*a* and a rear end 126*b*. The carrier arms 122 engage the housing 14 and slide along the carrier slots 126 between the front end 126*a* and the rear end 126*b* when the trigger 94 is actuated and when the force on the trigger 94 (in the actuation direction) is released. The front end 126*a* defines a location of the carrier arms 122 that corresponds to the trigger 94 fully actuated. The rear end 126*b* defines a location of the carrier 30 that corresponds to the carrier 30 in the second (e.g., maximum) start position. With reference to FIGS. 7-9, inhibiting rotation of the carrier body 114 may be desirable to ensure that the glue stick 4 is properly guided along the insertion axis A1 from the knob 74 at the second end 42 to the output nozzle 18 at the first end 38 (e.g., as illustrated in FIG. 1).

In operation of the glue gun 10, and with reference to FIGS. 10 and 11, a user may determine and set the desired amount of glue to be dispensed from the glue gun 10 in response to actuation of the trigger 94 by adjusting the knob 74. That is, a user determines a desired amount of glue to be dispensed by varying the position of the carrier 30, which alters where the trigger 94 starts in the unactuated position. When the knob 74 is rotated, the threaded body 86 engages the main housing portion 34 to transfer rotational motion of the knob 74 to translational motion of the projection 90. Clockwise rotation of the knob 74 moves the projection 90 toward the first end 38 and decreases the distance that the carrier 30 may travel in the carrier slots 126, which correlates to a relatively smaller quantity of glue that may be dispensed. Stated another way, clockwise rotation of the knob 74 pushes the carrier 30 toward the first end 38 (and toward the first or minimum position). With reference to FIG. 12, moving the carrier 30 toward the first end 38 moves the carrier arms 122 toward the front end 126*a* of the carrier slots 126, which shortens the stroke length of the carrier 30. As shown in FIGS. 7-9, as the carrier 30 moves toward the first end 38, the linkage mechanism 98 moves with the carrier 30, which causes the trigger 94 to pivot or rotate a corollary distance toward the full-actuated position, which shortens the trigger actuation path. That is, movement of the linkage mechanism 98 with the carrier 30 toward the first end 38 due to rotation of the knob 74 changes or adjusts the start position or unactuated position of the trigger 94. As such, when the maximum possible stroke length of the carrier 30 is shortened by the stroke adjustment mechanism

22, the total pivotal distance of the trigger 94 is correspondingly shortened between the unactuated position and the full-actuated position.

With reference to FIGS. 10 and 11, counter-clockwise rotation of the knob 74 moves the projection 90 away from the first end 38 and increases the distance that the carrier 30 may travel in the carrier slots 126, which correlates to a relatively larger quantity of glue that may be dispensed from actuation of the trigger 94. Counter-clockwise rotation of the knob 74 moves the projection 90 away from the carrier 30, which enables the carrier 30 to move away from the first end 38 (toward or to the second or maximum position) due to the bias of the spring 112. With reference to FIG. 13, moving the carrier 30 away from the first end 38 moves the carrier arms 122 relatively farther away from the front end 126*a* and relatively closer to the rear end 126*b* of the carrier slots 126, which increases the stroke length of the carrier 30. With reference to FIGS. 7-9, as the carrier 30 moves toward the second end 42, the linkage mechanism 98 moves with the carrier 30, which causes the trigger 94 to pivot or rotate a corollary distance away from the full-actuated position, which lengthens the trigger actuation path. That is, movement of the linkage mechanism 98 with the carrier 30 toward the second end 42 changes or adjusts the start position or unactuated position of the trigger 94. More generally, when the stroke length of the carrier 30 is lengthened or shortened by the stroke adjustment mechanism 22, the total pivotal distance of the trigger 94 is correspondingly lengthened or shortened between the unactuated position and the full-actuated position.

Regardless of the starting position of the carrier 30, a user may release the trigger 94 prior to reaching the full-actuated position such that the glue gun 10 dispenses less glue than the amount of glue that would be dispensed if the trigger 94 had moved completely to the full-actuated position. As such, adjusting the knob 74 adjusts the maximum quantity of glue that can be dispensed in each corresponding position of the carrier 30 in response to full actuation of the trigger assembly 26, but the adjustment does not inhibit a user from dispensing less than the maximum quantity of glue.

The desired amount of glue to be dispensed may be set by rotation of the knob 74 before a glue stick 4 is loaded in the glue gun 10. A glue stick 4 may be loaded by inserting the glue stick 4 through the aperture 70 in the knob 74 along the insertion axis A1 and through the cavity 118 such that the teeth 104 engage the glue stick 4. With the glue stick 4 inserted through the carrier 30, a user may then actuate the trigger 94. As illustrated in FIGS. 10 and 11, rotating or pivoting the trigger 94 results in forward translation of the first linkage 102, the second linkage 106, and the carrier 30 toward the first end 38 of the main housing portion 34 to guide the glue stick 4 along the insertion axis A1 toward the heating element 54 and the output nozzle 18. The teeth 104 may engage the glue stick 4 to pull the glue stick 4 with the carrier 30 until the carrier arms 122 reach the front end 126*a* of the carrier slots 126 (FIG. 12). As the glue stick 4 passes the heating element 54, the glue melts and may be dispensed from the output nozzle 18 onto a workpiece. After glue has been applied to a workpiece, the trigger 94 may be released. With the trigger 94 released, the spring force of the spring 112 pulls the trigger assembly 26 and the carrier 30 away from the first end 38 of the main housing portion 34. As the trigger assembly 26 and the carrier 30 move away from the first end 38, the trigger 94 rotates toward the unactuated position (e.g., as illustrated in FIG. 10).

As described above, some or all illustrated features may be omitted in a particular implementation within the scope of the present disclosure, and some illustrated features may not be required for implementation of all embodiments. The features described above may be implemented in an order different from the order described above and does not prohibit implementation in another order or combination. While not explained in detail for each embodiment and/or construction, the features of the disclosure described herein may be included on a tape dispenser independent of other features and are not limited to the illustrated disclosure. Embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

According to an aspect of the disclosure provided above, for example, in reference to any one or any combination of some or all of FIGS. 1-13, the disclosure provides a glue gun including a housing extending along an axis and including a first end and a second end opposite the first end, the first end including an outlet configured to dispense glue from the housing, an actuator coupled to the housing, a carrier supported by the housing and configured to support a glue stick, the carrier coupled to the actuator and movable a distance along the axis in response to actuation of the actuator to guide a glue stick toward the first end, and a stroke adjustment mechanism coupled to the carrier to adjust the distance that the carrier is movable along the axis.

In some embodiments, the disclosure provides a glue gun in which the distance that the carrier is movable along the axis defines a maximum quantity of glue that can be dispensed in response to the actuator being moved a full amount.

In some embodiments, the disclosure provides a glue gun in which the stroke adjustment mechanism includes a knob that is rotatable to vary the distance that the carrier is movable along the axis.

In some embodiments, the disclosure provides a glue gun in which the stroke adjustment further includes a ram coupled to the knob and extending toward and engageable with the carrier, and wherein rotation of the knob translates the ram to move the carrier along the axis.

In some embodiments, the disclosure provides a glue gun in which the ram includes a threaded portion that engages the body to transfer rotational motion of the knob to translational motion of the ram.

In some embodiments, the disclosure provides a glue gun in which rotation of the knob in a first direction increases the distance the carrier is movable by the actuator, and wherein rotation of the knob in a second direction decreases the distance the carrier is movable by the actuator.

In some embodiments, the disclosure provides a glue gun in which the knob includes indicia to indicate the first direction and the second direction.

In some embodiments, the disclosure provides a glue gun in which the carrier has a first position in which a maximum quantity of glue can be dispensed in response to a full actuation of the actuator, and a second position in which a minimum quantity of glue can be dispensed in response to a full actuation of the actuator.

In some embodiments, the disclosure provides a glue gun in which the carrier is movable between the first position and the second position by rotation of the knob.

In some embodiments, the disclosure provides a glue gun in which the housing defines an opening between the first end and the second end of the housing, and wherein the carrier is visible via the opening in any position between the first position and the second position.

In some embodiments, the disclosure provides a glue gun in which the housing includes indicia proximate the opening to indicate a first position and the second position.

According to another aspect of the disclosure provided above, for example, in reference to any one or any combination of some or all of FIGS. 1-13, the disclosure provides a glue gun including a housing extending along an axis and including a first end and a second end opposite the first end, the first end including an outlet configured to dispense glue from the housing, an actuator coupled to the housing and movable between an unactuated position and a full-actuated position, a carrier supported by the housing and configured to hold a glue stick, the carrier coupled to the actuator and movable a distance along the axis in response to actuation of the actuator to guide the glue stick toward the first end, and a knob positioned on or adjacent the second end and including an aperture that is configured to receive and surround a glue stick on insertion of the glue stick into the housing.

In some embodiments, the disclosure provides a glue gun in which the knob is rotatable to adjust an amount of glue configured to be dispensed from the glue gun in response to movement of the actuator to the full-actuated position.

In some embodiments, the disclosure provides a glue gun in which the knob includes indicia at least partially surrounding the aperture, and wherein the indicia indicate a first rotational direction of the knob configured to increase the amount of glue to be dispensed from the glue gun and a second rotational direction of the knob configured to decrease the amount of glue to be dispensed from the glue gun.

According to another aspect of the disclosure provided above, for example, in reference to any one or any combination of some or all of FIGS. 1-13, the disclosure provides a glue gun including a housing extending along an axis and including a first end and a second end opposite the first end, the first end including an outlet configured to dispense glue from the housing, a trigger assembly including a linkage mechanism having a first linkage coupled to the carrier and a second linkage, and a trigger operably coupled to the second linkage, the trigger actuatable to translate the linkage mechanism and the carrier toward the first end of the housing, and a carrier supported by the housing and configured to support a glue stick, the carrier coupled to the actuator and movable a distance along the axis in response to actuation of the actuator to guide the glue stick toward the first end, the carrier further movable absent actuation of the actuator to vary the amount of glue configured to be dispensed from the housing.

In some embodiments, the disclosure provides a glue gun further including a stroke adjustment mechanism including a knob that is rotatable to vary the amount of glue configured to be dispensed from the glue gun, and wherein the knob and the trigger mechanism are independently operable.

In some embodiments, the disclosure provides a glue gun in which the knob is rotatable counter-clockwise to increase or decrease the amount of glue to be dispensed from full actuation of the trigger, and wherein the knob is rotatable clockwise to oppositely decrease or increase the amount of glue to be dispensed from full actuation of the trigger.

In some embodiments, the disclosure provides a glue gun in which the stroke adjustment mechanism further includes a ram coupled to the knob such that rotation of the knob induces translational movement of the ram, and wherein the ram is engaged with the carrier to move the carrier along the axis when the trigger is in an unactuated position.

In some embodiments, the disclosure provides a glue gun in which the first linkage and the second linkage translates and move in response to movement of the carrier and in response to movement of the trigger.

In some embodiments, the disclosure provides a glue gun in which the carrier includes a guide arm engaged with the housing to inhibit rotation of the carrier when the trigger is actuated.

Although the invention has been described with reference to certain embodiments, variations and modifications exist within the scope and spirit of one or more independent aspects of the invention as described. Various features of the invention are set forth in the following claims.

The invention claimed is:

1. A glue gun comprising:

a housing extending along an axis and including a first end and a second end opposite the first end, the first end including an outlet configured to dispense glue from the housing;

an actuator coupled to the housing;

a carrier supported by the housing and configured to support a glue stick movable on the axis, the carrier coupled to the actuator and movable a distance along the axis in response to actuation of the actuator to guide a glue stick toward the first end; and a stroke adjustment mechanism coupled to the carrier and including a knob rotatable to adjust the distance that the carrier is movable along the axis, the stroke adjustment mechanism further including a ram coupled to the knob and on the axis, the ram extending toward and engageable with the carrier, wherein rotation of the knob moves the ram to adjust the carrier along the axis.

2. The glue gun of claim 1, wherein the carrier has a first position in which a maximum quantity of glue can be dispensed in response to a full actuation of the actuator, and a second position in which a minimum quantity of glue can be dispensed in response to a full actuation of the actuator.

3. The glue gun of claim 2, wherein the housing defines an opening between the first end and the second end of the housing, and wherein the carrier is visible via the opening in any position between the first position and the second position.

4. The glue gun of claim 3, wherein the housing includes indicia proximate the opening to indicate a first position and the second position.

5. The glue gun of claim 2, wherein the carrier is movable between the first position and the second position by rotation of the knob.

6. The glue gun of claim 1, wherein rotation of the knob in a first direction increases the distance the carrier is movable by the actuator, and wherein rotation of the knob in a second direction decreases the distance the carrier is movable by the actuator.

7. The glue gun of claim 6, wherein the knob includes indicia to indicate the first direction and the second direction.

8. The glue gun of claim 1, wherein the distance that the carrier is movable along the axis defines a maximum quantity of glue that can be dispensed in response to the actuator being moved a full amount.

9. The glue gun of claim 1, wherein the ram includes a threaded portion that engages a body to transfer rotational motion of the knob to translational motion of the ram.

10. A glue gun comprising:
a housing extending along an axis and including a first end and a second end opposite the first end, the first end including an outlet configured to dispense glue from the housing;
a projection supported by the housing adjacent the second end;
a trigger assembly including
a linkage mechanism having a first linkage coupled to a second linkage, and
a trigger operably coupled to the second linkage, the trigger actuatable to translate the linkage mechanism toward the first end of the housing; and
a carrier supported by the housing and configured to support a glue stick, the carrier coupled to the trigger via the linkage mechanism and movable a distance along the axis in response to actuation of the trigger and movement of the linkage mechanism to guide the glue stick toward the first end, the projection engaged with the carrier from behind the carrier to move the carrier absent actuation of the trigger to vary the amount of glue configured to be dispensed from the housing,
wherein the first linkage and the second linkage are configured to move with the carrier in response to movement of the carrier absent actuation of the trigger, and
wherein the projection is disengaged from the carrier on actuation of the trigger to move the glue stick.

11. The glue gun of claim 10, further comprising a stroke adjustment mechanism including a knob that has the projection and that is rotatable to vary the amount of glue configured to be dispensed from the glue gun, and wherein the knob and the trigger mechanism are independently operable.

12. The glue gun of claim 11, wherein the knob is rotatable counter-clockwise to increase or decrease the amount of glue to be dispensed from full actuation of the trigger, and wherein the knob is rotatable clockwise to move the projection and oppositely decrease or increase the amount of glue to be dispensed from full actuation of the trigger.

13. The glue gun of claim 11, wherein the stroke adjustment mechanism further includes a ram coupled to the knob and defining the projection such that rotation of the knob induces translational movement of the ram, and wherein the ram is engaged with the carrier to move the carrier along the axis when the trigger is in an unactuated position.

14. The glue gun of claim 10, wherein the carrier includes a guide arm engaged with the housing to inhibit rotation of the carrier when the trigger is actuated.

15. The glue gun of claim 10, further comprising a stroke adjustment mechanism coupled to the carrier and including a knob to adjust the distance that the carrier is movable.

16. A glue gun comprising:
a housing extending along an axis and including a first end and a second end opposite the first end, the first end including an outlet configured to dispense glue from the housing;
an actuator coupled to the housing and movable between an unactuated position and a full-actuated position;
a carrier supported by the housing and configured to hold a glue stick, the carrier coupled to the actuator and movable a distance along the axis in response to actuation of the actuator to guide the glue stick toward the first end; and
a knob positioned on or adjacent the second end and including an aperture configured to receive and surround the glue stick on insertion of the glue stick into the housing; and
a projection coupled to or engaged with the knob and defining a rearward limit of the carrier, the projection engaged with the carrier in the unactuated position.

17. The glue gun of claim 16, wherein the knob is rotatable to adjust an amount of glue configured to be dispensed from the glue gun in response to movement of the actuator to the full-actuated position.

18. The glue gun of claim 17, wherein the knob includes indicia at least partially surrounding the aperture, and wherein the indicia indicate a first rotational direction of the knob configured to increase the amount of glue to be dispensed from the glue gun and a second rotational direction of the knob configured to decrease the amount of glue to be dispensed from the glue gun.

19. The glue gun of claim 16, wherein the knob has a threaded body and the projection extends forward from the threaded body to engage the carrier.

20. The glue gun of claim 16, wherein the projection includes an aperture configured to receive and surround the glue stick on insertion of the glue stick into the housing.

* * * * *